United States Patent [19]

Hagiwara et al.

[11] Patent Number: 4,592,006

[45] Date of Patent: May 27, 1986

[54] ADDER FOR FLOATING POINT DATA SUITABLE FOR DIGITAL SIGNAL PROCESSING

[75] Inventors: Yoshimune Hagiwara; Shizuo Sugiyama, both of Kodaira; Narimichi Maeda, Tachikawa; Osamu Yumoto, Kokubunji; Takashi Akazawa, Kodaira; Masahito Kobayashi, Yokohama; Yasuhiro Kita, Hachioji; Yuzo Kita, Fuchu, all of Japan

[73] Assignees: Hitachi, Ltd.; Hitachi Denshi Kabushiki Kaisha, both of Tokyo, Japan

[21] Appl. No.: 700,907

[22] Filed: Feb. 12, 1985

Related U.S. Application Data

[62] Division of Ser. No. 311,680, Oct. 15, 1981, Pat. No. 4,511,990.

[30] Foreign Application Priority Data

Oct. 31, 1980 [JP] Japan .................................. 55-152051

[51] Int. Cl.$^4$ ............................................. G06F 7/50
[52] U.S. Cl. ..................................................... 364/748
[58] Field of Search ............................... 364/748, 745

[56] References Cited

U.S. PATENT DOCUMENTS

4,366,548 12/1982 Kregness et al. .................. 364/748
4,429,370 1/1984 Blau et al. ......................... 364/748

OTHER PUBLICATIONS

Smith et al., "Fixed-Point, Floating-Point Adder", *Technical Notes*—A publication of RCA/Princeton, N.J. in No. 846, 3 sheets, Oct. 8, 1969.
Hale et al., "Biased and Non-Biased Binary Conversion and Exponent Under/Over Flow Detection", *IBM Tech. Disclosure Bulletin*, vol. 23, No. 1, Jun. 1980, pp. 252–254.

*Primary Examiner*—David H. Malzahn
*Attorney, Agent, or Firm*—Antonelli, Terry & Wands

[57] ABSTRACT

In an adder for floating point data, two floating point data are adjusted so that the exponent parts have the same value and the resulting adjusted mantissa parts are added. A first shift signal is generated on the basis of the result of the added mantissa parts and having a value necessary for normalization of the addition result, and a second shift signal is generated having a value equal to the difference between the adjusted exponent part of the floating point data and a minimum value predetermined for an exponent of any floating point data at which underflow occurs. The result of addition of the adjusted mantissa parts is shifted on the basis of said second shift signal or said first shift signal depending on whether or not an underflow occurs.

9 Claims, 29 Drawing Figures

(A) X.Y → MULT (B) P.A → ALU (C) X.Y.D → ALU (D) ACC → D

ADDER FOR FLOATING POINT DATA SUITABLE FOR DIGITAL SIGNAL PROCESSING

This is a division of application Ser. No. 311,680 filed Oct. 15, 1981, now U.S. Pat. No. 4,511,990.

BACKGROUND OF THE INVENTION

The present invention relates to a digital signal processor, and more particularly to a digital processor which can produce the data of voices, images etc., in real time and which possesses the ability to perform multiply and add operations at high speed and with high accuracy.

In appartuses for synthesizing and analyzing speech or in apparatuses in the communication field such as a MODEM (modulator-demodulator), digital filter, CODEC and echo canceler, the application of a signal processor capable of processing digitized signals in real time has been studied.

The signal processor is provided as an LSI which contains a program memory and a multiplier as well as an adder/subtractor for exclusive use for processing data at high speed. It is adapted to various usages by changing the program stored in the program memory.

In a case where the signal processor is used, e.g., as a filter for processing of voice signals, the internal operation data has a comparatively wide dynamic range of 16–28 bits due to multiply and add operations. Therefore, when the structure of the multiplier or the adder/subtractor is of the fixed point data operation type, the hardware scale of the signal processor becomes larger exponentially with an increase in the number of bits of the operation data, and the LSI implementation of the signal processor becomes difficult. This problem can be solved by changing the construction of the processor to the floating point data operation type. However, when the data processing system of a conventional general-purpose computer, which is constructed so that the multiplier and the adder/subtractor are connected by data buses and perform floating point operations independently of each other, is adopted without modification, the multiply and add operations, which are the fundamental operations of the signal processor, take a long time, and the real time operation of the signals becomes difficult for this reason.

SUMMARY OF THE INVENTION

An object of the present invention is to provide a signal processor having a novel construction which is suitable for LSI implementation and which can process digital signals, such as voice signals at high speed and in real time.

Another object of the present invention is to provide a signal processor which can process both data in the fixed point representation and data in the floating point representation by the use of a single floating-point arithmetic circuit.

Still another object of the present invention is to provide a digital processor which can execute data input/output operations with an external circuit in the data format of the fixed point representation and internal operations in the floating point representation format.

Yet another object of the present invention is to provide a digital signal processor whose dynamic range is expanded.

In order to accomplish these objects, a digital signal processor according to the present invention comprises an interface circuit for data input/output operations with an external device; a first data bus which has a predetermined number of bits and which is connected to the interface circuit; at least one data storage device connected to the data bus; at least one second data bus onto which data from the data storage device is read out; a floating point multiplication circuit connected with the first and second data buses and for adding exponent parts and multiplying mantissa parts of a pair of data applied thereto, to deliver an operated result having a number of bits larger than that of the first data bus; a floating addition/subtraction circuit including an input selection portion selecting a pair of data appointed by a program instruction from among a plurality of data containing the output of the multiplication circuit, and for adding/subtracting the pair of data; an accumulation device for holding data delivered from said addition/subtraction circuit and having a number of bits larger than that of the first data bus; a third data bus which has a number of bits larger than that of said first data bus and which supplies an output of the accumulation device to the input selection portion of the addition/subtraction circuit; switching device connected between the accumulation device and the first data bus and for reducing the number of bits of the output data of the accumulation device and then supplying the resultant data to the first data bus; and a controller for controlling the operations of the overall system in accordance with program instructions.

BRIEF DESCRIPTION OF THE DRAWINGS

FIG. 3(A) is a diagram for explaining the bit format of an input data, while

DESCRIPTION OF THE EMBODIMENTS

Figure 1:
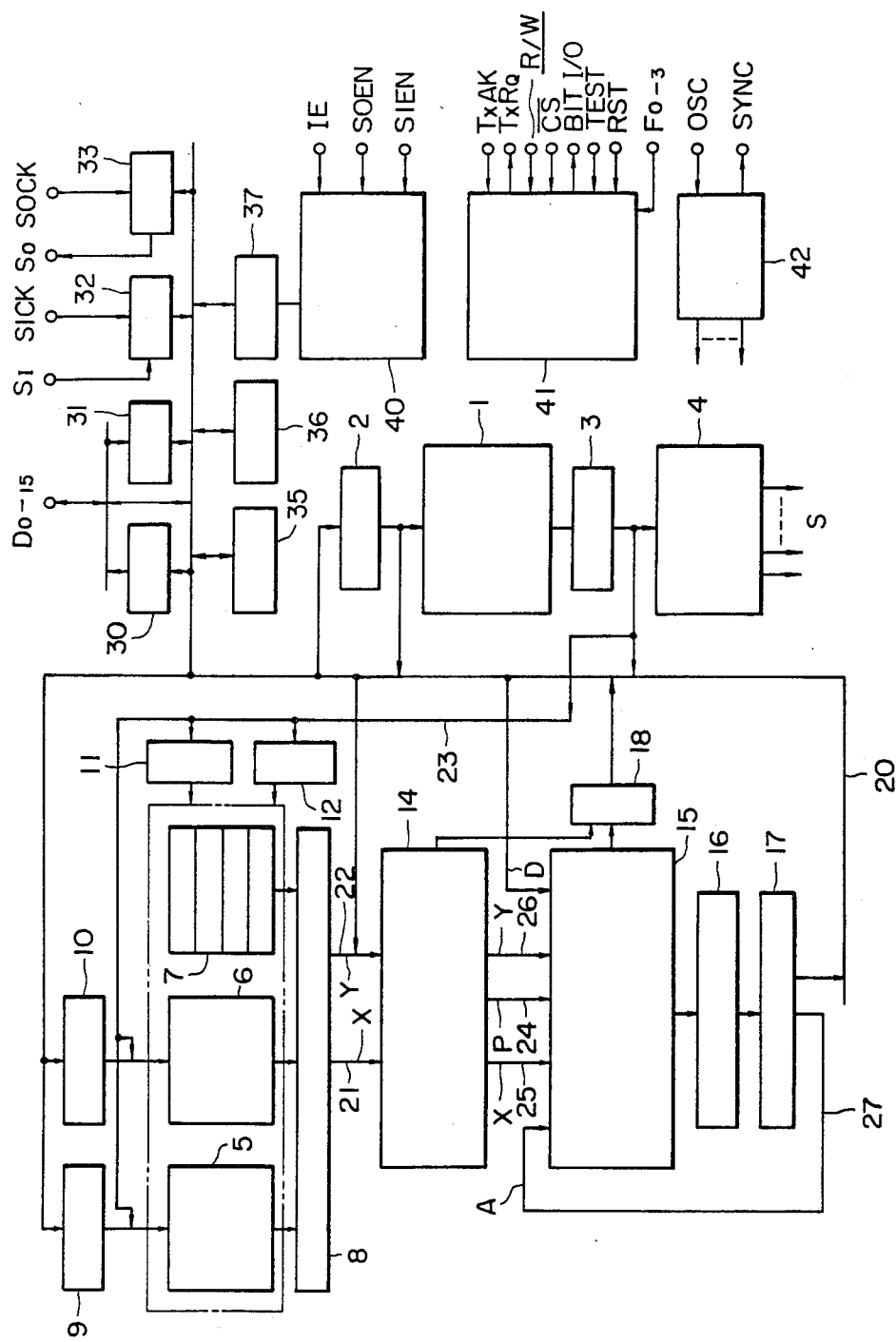
FIG. 1 is a block diagram showing an example of the general construction of a digital signal processor according to the present invention.

FIG. 1 is a general block diagram of a digital signal processor according to the present invention. Numeral 1 designates a memory which serves to store a program, numeral 2 a program counter which indicates a readout address of the program memory 1, numeral 3 an instruction register which is connected to the program memory 1, and numeral 4 a control circuit which generates various control signals S for operating the processor from an instruction word fetched into the instruction register 3. In this embodiment, each instruction word to be stored in the memory 1 consists of, for example, 22 bits and includes an operation code and data, an address or address control information. The program counter 2 and the instruction register 3 are connected to a data bus (D bus) 20 of 16 bits.

Numerals 5 and 6 designate memories for storing data, and numeral 7 designates a general-purpose register. One of the memories 5 and 6 is a random access memory (RAM) and the other is a read-only memory (ROM). Each memory may well be a complex arrangement consisting of a plurality of ROMs or RAMs of small capacities. The memory stores data item of 16 bits, and each data is read out onto an X bus 21 or Y bus 22 of 16 bits through a selector circuit 8. Numerals 9 and 10 designate registers which appoint the lower addresses of the data memories 5 and 6, and numerals 11 and 12 designate registers which appoint the upper addresses of the memories, respectively. The register 11 affords the upper address of the data to be read out onto the X bus 21, while the register 12 affords the upper address of the data to be read out onto the Y bus 22 or the address of the general-purpose register 7. These registers are given address information through a data bus 23 from the instruction register 3.

Shown at numeral 14 is a multiplier of the floating point operation type which calculates the product between the two data items supplied from the X bus 21 and the Y bus 22 and which delivers the result to a P bus 24. As will be described later, this multiplier 14 includes registers for holding the two input data items X and Y and delivers the two unoperated data items X and Y to an X bus 25 and a Y bus 26 as they are, respectively.

Numeral 15 denotes an adder/subtracter of the floating point operation type, which executes an operation by receiving the output data X, Y and P of the multiplier 14 and data D and A of data buses 20 and 27 and which delivers the result of the operation to an accumulator 16. Numeral 17 denotes a switching circuit which supplies the data bus (A bus) 27 of 20 bits with the floating point data latched in the accumulator 16 and which converts the data into data of 16 bits and delivers the latter to the D bus 20. Numeral 18 denotes a status code register which is connected to the multiplier 14 and the adder/subtracter 15 and which stores a status code concerning the operated results thereof.

Numeral 30 designates an output register for delivering the data of 16 bits on the data bus 20 to external terminals $D_0$–$D_{15}$ in parallel, while numeral 31 designates an input register for receiving the 16-bit data from the external terminals onto the data bus 20 in parallel. Numeral 32 denotes a shift register of 16 bits for loading serial input data from a terminal SI in synchronism with the input clock of a terminal SICK in the period during which the input pulse of a terminal SIEN is "1", while numeral 33 denotes a shift register of 16 bits for serially delivering data to a terminal SO in synchronism with the input clock of a terminal SOCK in the period during which the input pulse of a terminal SOEN is "1". These two shift registers are respectively connected with the data bus 20 in a 16-bit parallel fashion.

Numeral 35 designates a register which controls the operating status of the processor, numeral 36 a counter in which a repetition number is set in case of causing the processor, to repeatedly execute a certain instruction in accordance with a repeat instruction, and numeral 37 a status register which indicates the internal status of the processor. The contents of the registers 35 and 37 can be respectively written and read externally through the data bus 20 and the terminals $D_0$–$D_{15}$.

Numeral 40 denotes a control circuit for controlling an interrupt to a processor operation and an input/output operation. By way of example, it operates so as to render the shift registers 32 and 33 operable with the rising edges of the input signals of the terminals SIEN and SOEN and to apply an interrupt to the program with the falling edges of the respective signals and so as to start the registers 30 and 31 with the rising edges of the input and output signals of a terminal IE and to apply an interrupt to the program with the falling edges thereof. Numeral 41 denotes a function control circuit which controls the processor operation in response to a signal from an external control unit (for example, a microcomputer). By way of example, it receives from a terminal TxAK an acceptance signal for a DMA transfer mode, from a terminal R/W a signal indicating the transfer direction of parallel input/output data, from a terminal CS a signal indicating that an external device has selected the processor, from a terminal TEST an appointment signal for a test operation mode, from a terminal RST a reset signal, and from a terminal $F_{0-3}$ an operation control signal by the external device, and it delivers a parallel data transfer request signal from a terminal TxRQ. A terminal BIT I/O is a bidirectional input/output terminal for receiving or delivering data every bit. Numeral 42 denotes a clock pulse generator circuit. It receives a fundamental clock through a terminal OSC from an external circuit, and on the basis of the fundamental clock, it generates various internal clocks necessary for processor operations and supplies a terminal SYNC with a clock for synchronizing the internal operation of the processor and an external system.

Now, the multiplier 14 and the adder/subtracter 15 will be described farther with reference to FIGS. 2, 3(A) and 3(B), and 4(A) and 4(B).

Figure 2:
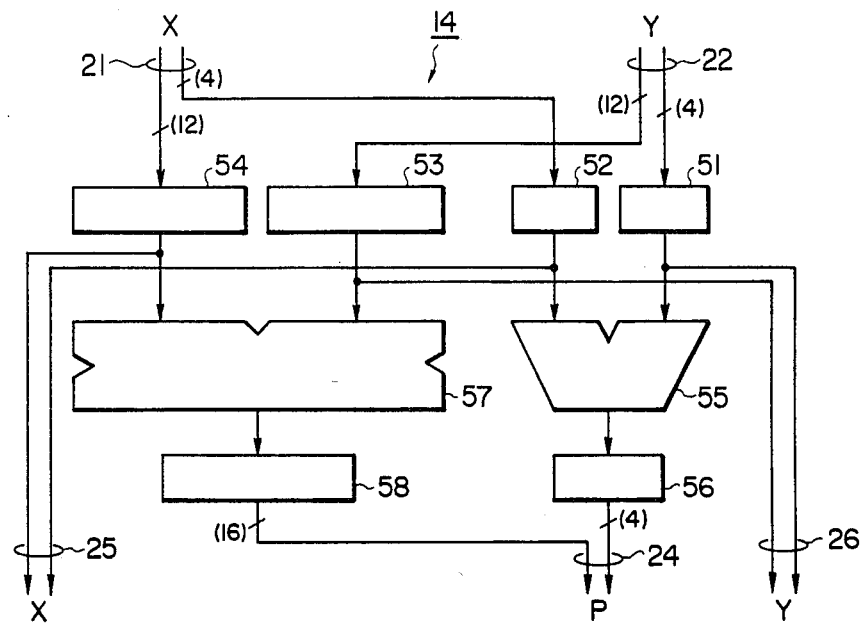
FIG. 2 is a diagram showing the detailed arrangement of a multiplier 14.
Figure 3A:
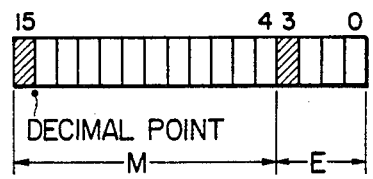
Figure 3B:
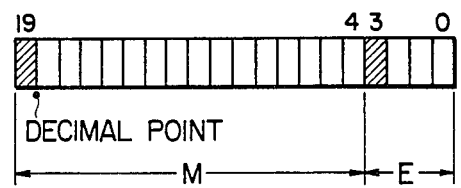
FIG. 3(B) is a diagram for explaining the bit format of an internal operation data in an adder/subtracter 15.

As shown in FIG. 2, the 16-bit data of the X bus 21 and the Y bus 22 are applied to the multiplier 14. This data is provided from the memories 5 and 6, the general-purpose register 7 or the data bus 20. As illustrated in FIG. 3(A), each of the data items consists of an exponent part formed by the less significant 4 bits and a mantissa part formed by the more significant 12 bits. The most significant bits of the respective parts as indicated by hatched lines, i.e., the bits at the positions of $2^3$ and $2^{15}$ are sign bits. A decimal point lies between the positions $2^{15}$ and $2^{14}$. As shown in FIG. 2, the exponent part data and mantissa part data supplied from the X bus 21 and Y bus 22 are respectively held in registers 51 and 52 and registers 53 and 54. The exponent part data of the registers 51 and 52 are added by an adder circuit 55, and the sum is delivered to the P bus 24 through an output register 56 of 4 bits. On the other hand, the mantissa part data of the registers 53 and 54 are applied to a multiplier circuit 57 having a circuit arrangement similar to that in the case of the ordinary fixed point operation, and the multiplied result has its more-significant 16 bits delivered to the P bus 24 through an output register 58. That is, the operated output of the multiplier 14 becomes data of 20 bits consisting of an exponent part forming the less significant 4 bits and a mantissa part forming the more significant 16 bits, as shown in FIG. 3(B), and this output is applied to the adder/subtracter 15. The outputs of the registers 52 and 54 are transmitted to the X bus 25 and the outputs of the registers 51 and 53 to the Y bus 26, and they are respectively applied to the adder/subtracter 15 as data of 16 bits.

Figure 4A:
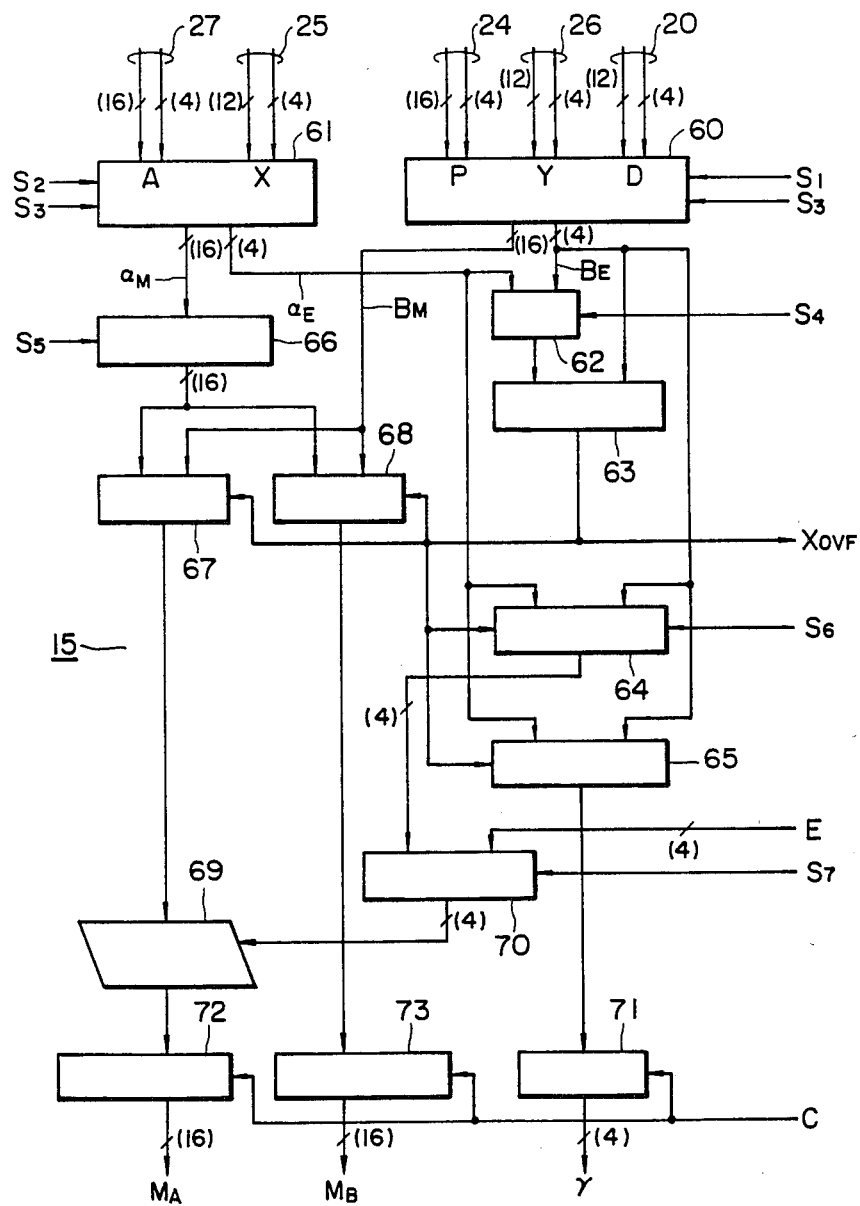
FIGS. 4(A) and 4(B) are diagrams showing in combination the detailed arrangement of the adder/subtracter 15.
Figure 4B:
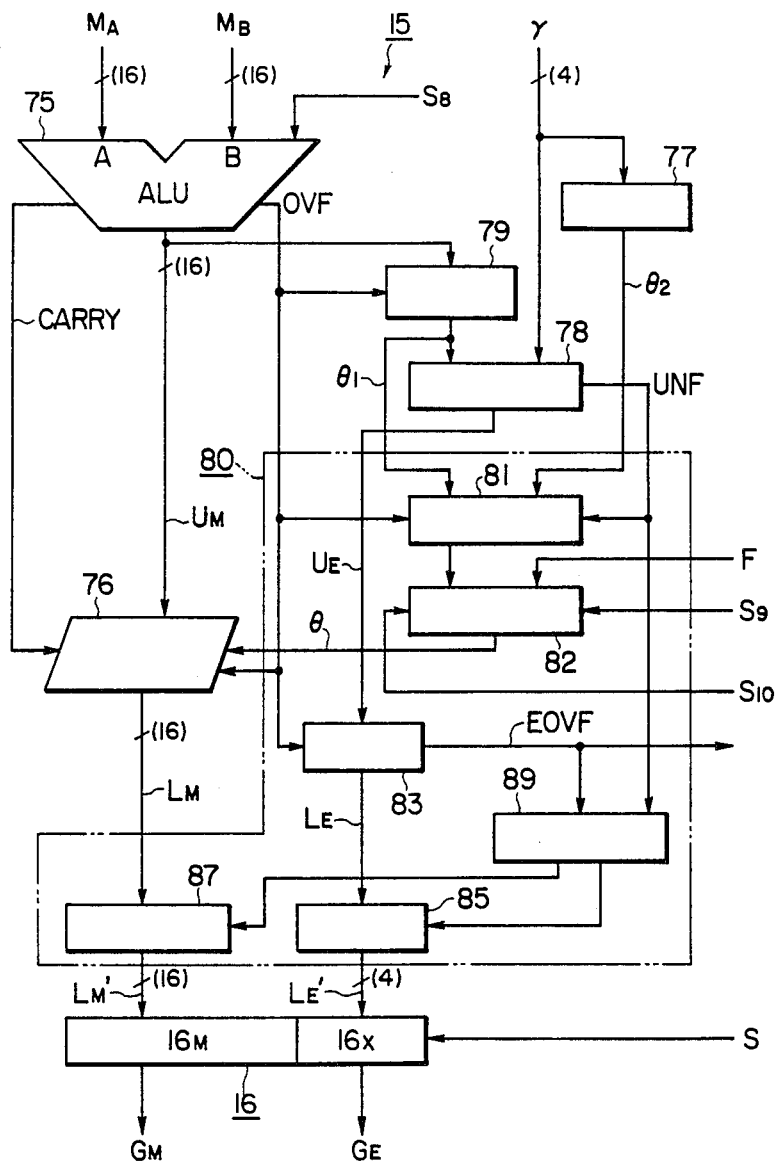

The arrangement of the adder/subtracter 15 is shown in FIGS. 4(A) and 4(B). As illustrated in FIG. 4(A), the adder/subtracter is supplied with the data D, P, X, Y and A through the buses 20 and 24–27. Among them, the data P, Y and D are applied to a selector circuit 60, and one data appointed by a control signal $S_1$ is selected. The data A and X are applied to a selector circuit 61, and one data appointed by a control signal $S_2$ is selected. Here, each of the input data D, X and Y is the 16-bit data shown in FIG. 3(A). As will be stated later, the selector circuits 60 and 61 are constructed so that when the 16-bit data has been selected, this data is converted into the 20-bit data shown in FIG. 3(B). This bit exchange differs depending upon whether the input data D, X and Y are fixed point data or floating point data, and the exchange operation is assigned by a control signal $S_3$. Thus, input data in the fixed point representation can also be processed by the adder/subtracter of the floating point operation type. Control signals $S_1$, $S_2$, $S_3$ . . . and $S_n$ are provided from the control circuit 4 in correspondence with instruction words in the program.

Letting the output data from the selector circuit 60 be $\beta$ (exponent part: $\beta_E$, mantissa part: $\beta_M$) and the output data from the selector circuit 61 be $\alpha$ (exponent part: $\alpha_E$, mantissa part: $\alpha_M$), the exponent part data $\alpha_E$ is applied to a comparator circuit 63 through a selector circuit 62 and is compared in magnitude with the exponent part data $\beta_E$. The exponent part data $\alpha_E$ and $\beta_E$ are also applied to a subtracter circuit 64 and a selector circuit 65. The mantissa part data $\alpha_M$ is applied to selector circuits 67 and 68 through a negate circuit 66, while the mantissa part data $\beta_M$ is directly applied to the selector circuits 67 and 68. In case of this embodiment, the negate circuit 66 is provided in order to effect subtraction between the data $\alpha$ and $\beta$ by the use of an arithmetic and logic (ALU) 75, and the data $\alpha_M$ passes through the negate circuit without any change in case of an addition. Each of the selector circuits 65, 67 and 68 selects one of its two inputs in response to the output signal of the comparator circuit 63. With a timing signal C, the output of the selector circuit 65 is latched in a latch circuit 71, the output of the selector circuit 67 is latched in a latch circuit 72 through a shift circuit 69, and the output of the selector circuit 68 is latched in a latch circuit 73. The subtracter circuit 64 is also controlled by the output of the comparator circuit 63, and it operates so as to subtract the smaller one from the greater one of the inputs $\alpha_E$ and $\beta_E$ in accordance with the comparison result. The shift circuit 69 shifts its input data rightward that number of bits which corresponds to the output of the subtracter circuit 64 obtained through a selector circuit 70. The operation of the shift circuit 69 can also be controlled by another data E applied to the selector circuit 70, and the selection of the shift number of bits is made with the control signal $S_7$.

As shown in FIG. 4(B), the outputs $M_A$ and $M_B$ of the latch circuits 72 and 73 are applied to the fixed point operation type adder (ALU) 75 which is operated by the control signal $S_8$, and the added result $U_M$ is applied to a leftward shift circuit 76. On the other hand, the output $\gamma$ of the latch circuit 71 is applied to a constant adder circuit 77 and one input terminal of a subtracter circuit 78. Numeral 79 denotes a zero detector which judges the output $U_M$ of the adder 75. In the case where the output $U_M$ of the adder afforded in the complement representation is a positive number, the zero detector counts the number of continuous "0" bits succeeding a sign bit located at the most significant bit of the output $U_M$. In the case where the output $U_M$ is a negative number, it counts the number of continuous "1" bits succeeding the sign bit. The output $\theta_1$ of the zero detector 79 is applied to the shift circuit 76 through an output correction circuit 80 disposed for the normalization of data and a protection against overflow, and it determines the number of bits of data to be shifted by this shift circuit. The output $\theta_1$ of the zero detector 79 is also applied to the other input terminal of the subtracter circuit 78, and the output $U_E$ of this subtracter circuit is applied to the exponent part 16X of the accumulator 16 through the output correction circuit 80. The mantissa part 16M of the accumulator 16 is supplied with an output data $L_M'$ from the shift circuit 76 as corrected in the output correction circuit 80.

The output correction circuit 80 is constructed of a selector circuit 81 which selects either the output $\theta_1$ of the zero detector 79 or the output $\theta_2$ of the constant adder circuit 77 in response to an overflow detection signal OVF provided from the adder 75 and an underflow detection signal UNF provided from the subtracter circuit 78; a selector circuit 82 which applies either of the output the selector circuit 81 or a data F given by the program, to the shift circuit 76 as a shift bit number-indicating signal $\theta$ in response to the control signal $S_9$ based on the program; an increment circuit 83 which adds 1 (one) to the subtracter circuit output $U_E$ when the overflow signal OVF is "1" and which delivers a signal EOVF when the added result $L_E$ has also undergone an overflow; an exponent part correction circuit 85 which is inserted between the increment circuit 83 and the exponent part 16X of the accumulator 16; a mantissa part correction circuit 87 which is inserted between the shift circuit 76 and the mantissa part 16M of the accumulator 16; and a control circuit 89 which controls the operations of the two correction circuits 85 and 87 in response to the signals UNF and EOVF.

The adder/subtracter 15 constructed as described above operates as follows.

The respective outputs $\alpha$ and $\beta$ of the two input selector circuits 61 and 60 shown in FIG. 4(A) are data in the floating point representation, and their values are denoted by the following expressions:

$$\left.\begin{array}{l}\alpha = \alpha_M \cdot 2^{\alpha_E} \\ \beta = \beta_M \cdot 2^{\beta_E}\end{array}\right\} \quad (1)$$

Assuming now a case of performing the addition operation between the two data $\alpha$ and $\beta$ being in the relation of $\alpha_E > \beta_E$, the added result Z is given by:

$$\begin{aligned}Z &= \alpha_M \cdot 2^{\alpha_E} + \beta_M \cdot 2^{\beta_E} \\ &= [\alpha_M + \beta_M \cdot 2^{-(\alpha_E - \beta_E)}] \cdot 2^{\alpha_E}\end{aligned} \quad (2)$$

The comparator circuit 63 compares the magnitudes of the data $\alpha_E$ and $\beta_E$. It causes the selector circuit 65 to select the greater exponent part data $\alpha_E$, causes the selector circuit 67 to select the mantissa part data $\beta_M$ corresponding to the smaller exponent part $\beta_E$, causes the selector circuit 68 to select the mantissa part data $\alpha_M$ corresponding to the greater exponent part $\alpha_E$, and applies a control signal to the subtracter circuit 64 so as to subtract the smaller exponent $\beta_E$ from the greater exponent $\alpha_E$. During the execution of the addition operation, the selector circuit 70 selects the output $(\alpha_E - \beta_E)$ from the subtracter circuit 64, and the shift circuit 69 operates so as to shift the output $\beta_M$ of the selector circuit 67 rightward (toward less significant bits) $(\alpha_E - \beta_E)$ bits. As a result, the respective outputs of the latch circuits 71, 72 and 73 become $\gamma = \alpha_E$, $e_A = \beta_M \cdot 2^{-(\alpha_E - \beta_E)}$ and $e_B = \alpha_M$, and the output $U_M$ of the adder 75 having performed the operation of $e_A + e_B$ represents the mantissa part of Expression (1). Accordingly, the operated value Z at this stage is indicated by the following expression:

$$Z = U_M \cdot 2^\gamma \quad (3)$$

Figure 5A:
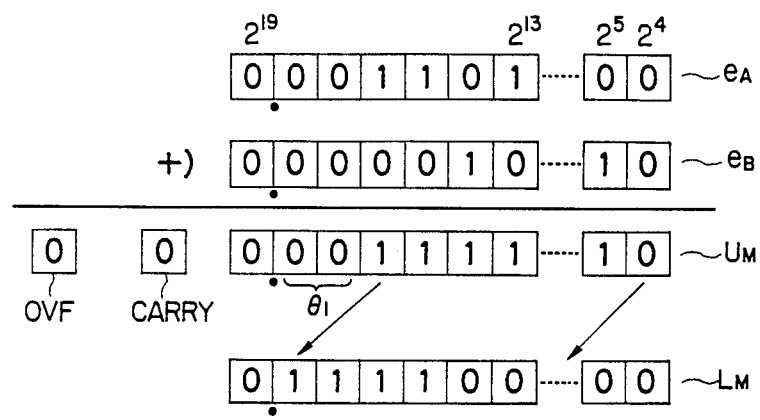
FIGS. 5(A) and 5(B) are diagrams for explaining the operation of a shift circuit 76.
Figure 5B:
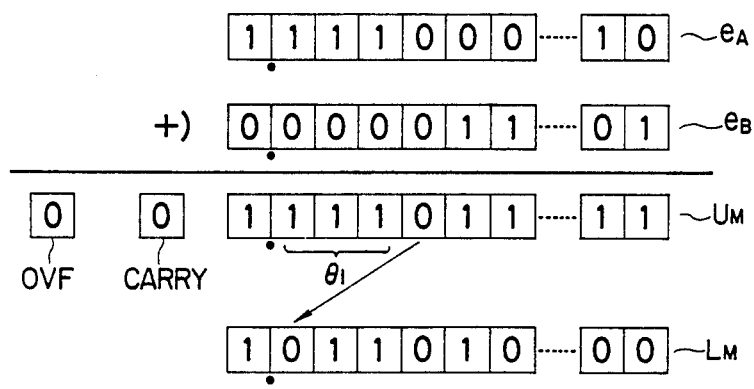

The zero detector circuit 79 and the leftward shift circuit 76 serve to normalize the adder output $U_M$ so as to maximize its absolute value. When, as illustrated in FIG. 5(A), the number $\theta_1$ of the continuous "0"s succeeding the sign bit (below the decimal point) of the data $U_M$ is detected by the zero detector circuit 79 and the data $U_M$ is shifted leftward (onto the side of the most significant bit) $\theta_1$ bits by the shift circuit 76, a mantissa part data $L_M$ whose absolute value is the maximum is obtained. In the case where the data $U_M$ is a negative number, it may be shifted by an amount equal to the number of the continuous "1"s as illustrated in FIG. 5(B). In this case, as regards the exponent part data $\gamma$, the operation of $(\gamma - \theta_1)$ is executed by the subtracter circuit 78, and its output $U_E$ is made a normalized exponent value. Unless the overflow occurs in the data $U_M$, the output $L_E$ of the increment circuit 83 becomes equal to the normalized exponent value $U_E$, and the processing of the normalization can be represented by the following expression:

$$\begin{aligned}Z &= [U_M \cdot 2^{\theta_1}] \cdot 2^{(\gamma - \theta_1)} \\ &= L_M \cdot 2^{L_E}\end{aligned} \quad (4)$$

Assuming the magnitude of the exponent part $\gamma$ to be 4 bits, values which $\gamma$ can express by the representation of 2's complements are limited within a range of $[+7 \geq \gamma \geq -8]$. Accordingly, when it is intended in the normalization of the mantissa part data to shift the data $U_M$ leftward fully by the detection value $\theta_1$ of the zero detector circuit 79, the value of $(\gamma - \theta_1)$ on the exponent part side becomes smaller than $-8$, and an underflow sometimes occurs in the subtracter circuit 78. At this time, the signal (borrow signal) UNF indicative of the underflow of the data is generated from the subtracter circuit 78 which executes the operation of $(\gamma - \theta_1)$. In the circuit of FIG. 4(B), when the signal UNF has appeared, the selector circuit 81 selects the output $\theta_2$ of the constant adder circuit 77 instead of the input $\theta_1$, and the constant adder circuit 77 provides as the data $\theta_2$ a value with a constant "8" added to the data $\gamma$ of the exponent part. Thus, by way of example, when the value of $\gamma$ is "$-5$", the value of $\theta_2$ becomes "3". Therefore, the shift number of bits of the mantissa part data $U_M$ is limited to 3 bits, and the value of the exponent part after the normalization remains at the minimum value "$-8$". The operation of making the exponent part "$-8$" upon the occurrence of the signal UNF is performed by the exponent part correction circuit 85 to be described later with reference to FIG. 9.

Figure 6A:
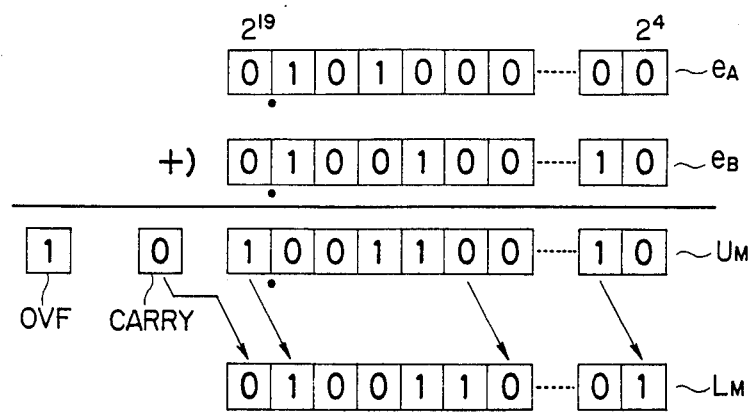
FIGS. 6(A) and 6(B) are diagrams for explaining another operation of the shift circuit 76.
Figure 6B:
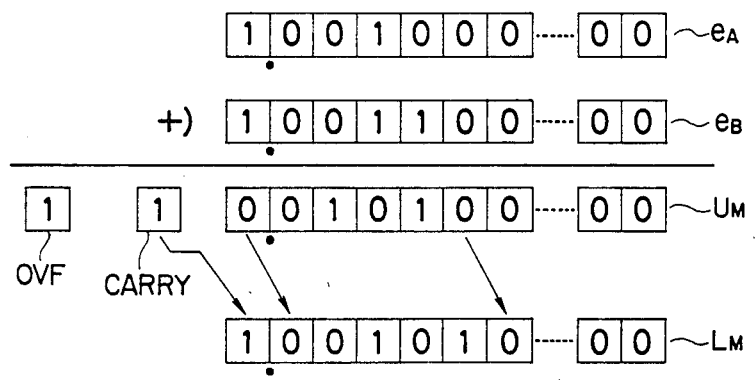

In the case where an overflow has occurred in the operated result $U_M$ of the adder 75 as illustrated in FIGS. 6(A) and 6(B), the true sign of the data appears at the carry output, and the most significant bit of the numerical value appears at the position of the sign bit. In this case, accordingly, the overflow detection signal OVF may be used to stop the operations of the selector circuit 81 and the zero detector circuit 79, to cause the shift circuit 76 to perform the 1-bit right shift operation and to cause the increment circuit 83 to perform the operation of $U_E(=\gamma)+1$ so as to operate the data Z as in the following expression:

$$Z = [U_M \cdot 2^{-1}] \cdot 2^{(\gamma + 1)} \quad (5)$$

Figure 7:
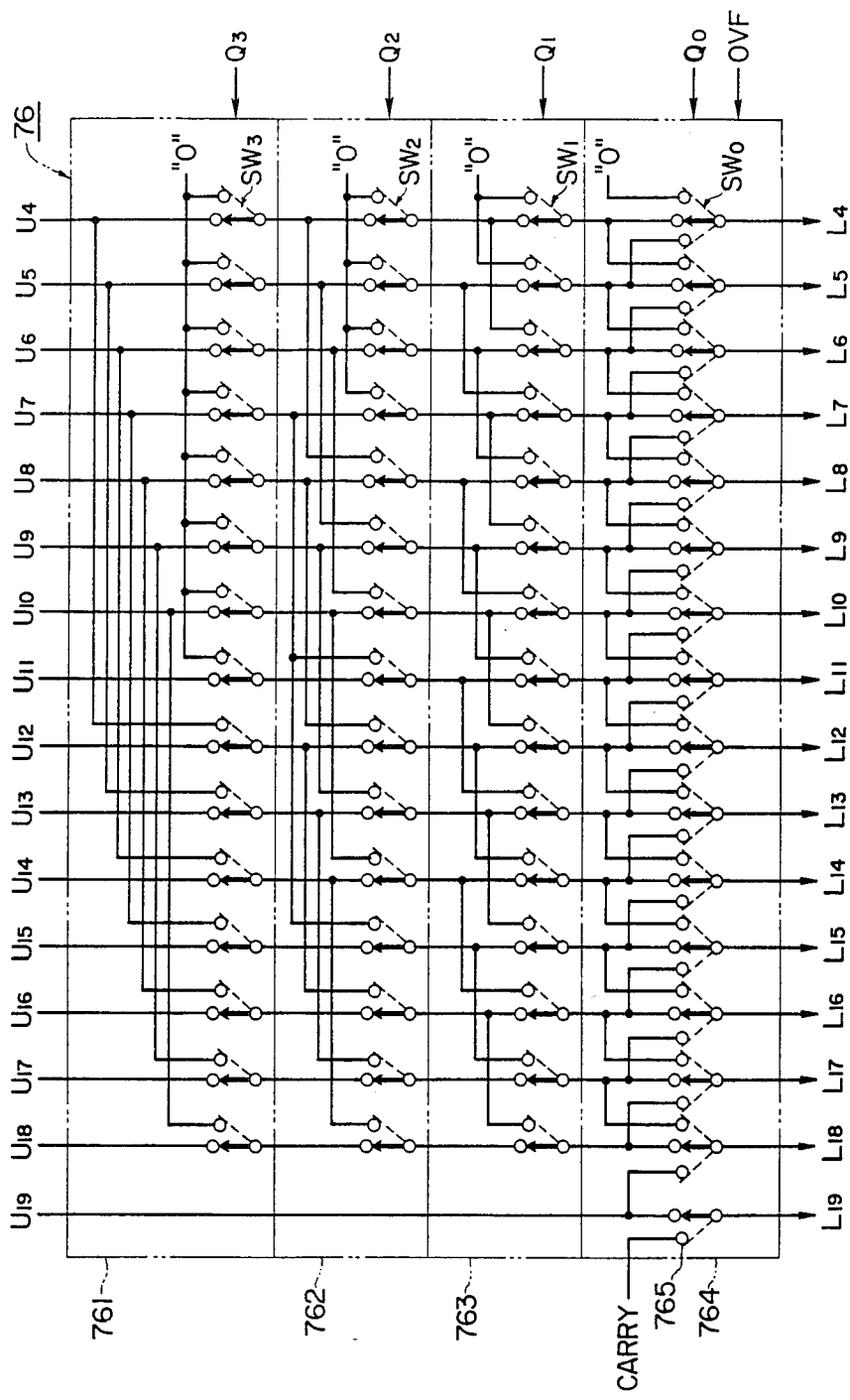
FIG. 7 is a circuit diagram showing an embodiment of the shift circuit 76.

An example of the shift circuit 76 for executing the above operation is shown in FIG. 7. This circuit is constructed of a shifter 761 of 8 bits, a shifter 762 of 4 bits, a shifter 763 of 2 bits and a shifter 764 of 1 bit which correspond to the respective bits $\theta_3 - \theta_0$ of the shift bit number-indicating data $\theta$. Switches $SW_3 - SW_0$ of the respective signal lines of the shifters are connected to contacts on less significant bit sides when the corresponding control bits $\theta_3 - \theta_0$ are "1". The respective switches $SW_0$ of the 1-bit shifter 764 are connected to contacts on more significant bit sides when the overflow detection signal OVF is "1", the output line $L_{19}$ of the sign bit is connected with a carry signal input terminal 765, and the 1-bit right shift operation of the data stated above is realized.

Figure 8A:
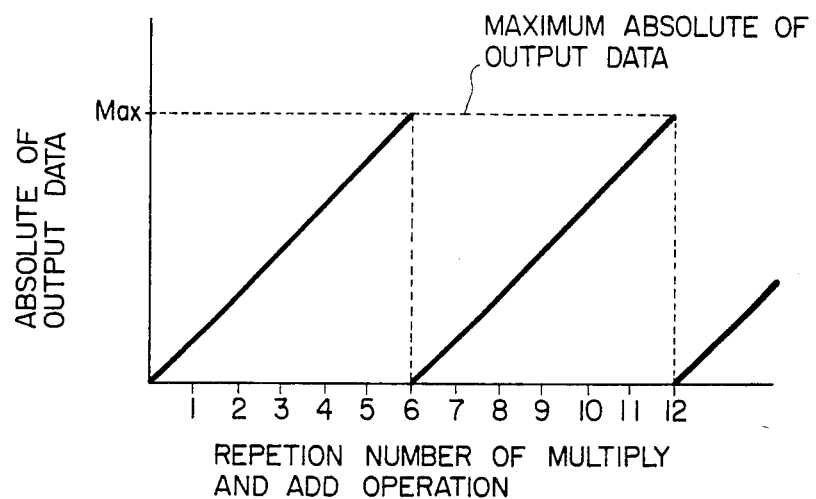
FIGS. 8(A) and 8(B) are diagrams for explaining output data in the absence and presence of a compensation for a data overflow, respectively.

When, in the circuit of FIGS. 4(A) and 4(B), the overflow detection signal OVF of the adder 75 has become "1", an overflow sometimes occurs also in the operated result of $(\gamma + 1)$ by the increment circuit 83. In this case, it is determined that the operated result $Z(=\alpha + \beta)$ has undergone an overflow. If a multiply and add operation is continued and the condition left intact, the absolute value of the output data to be obtained in the accumulator 16 varies as shown in FIG. 8(A) and becomes a quite meaningless value.

Figure 8B:
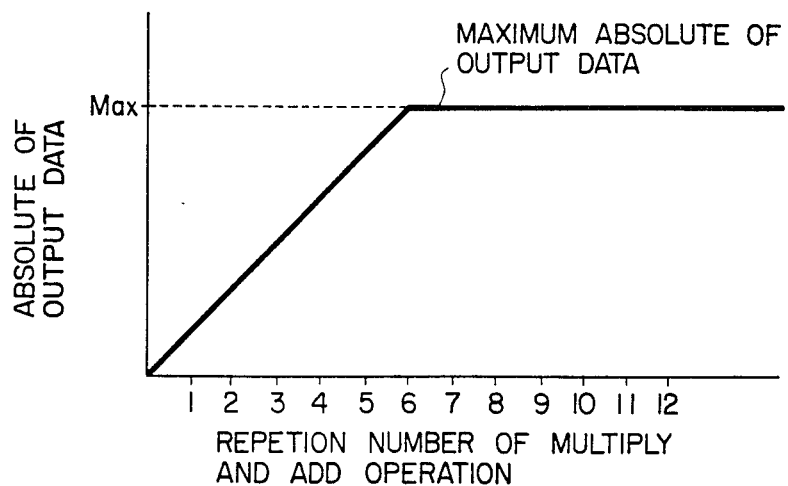

The control circuit 89 and the correction circuits 85 and 87 constitute a circuit which operates upon the occurrence of the overflow in the operated result Z so as to fix the absolute value of the output data to the positive or negative maximum value as illustrated in FIG. 8(B). A concrete example of an arrangement thereof is shown in FIG. 9.

Figure 9:
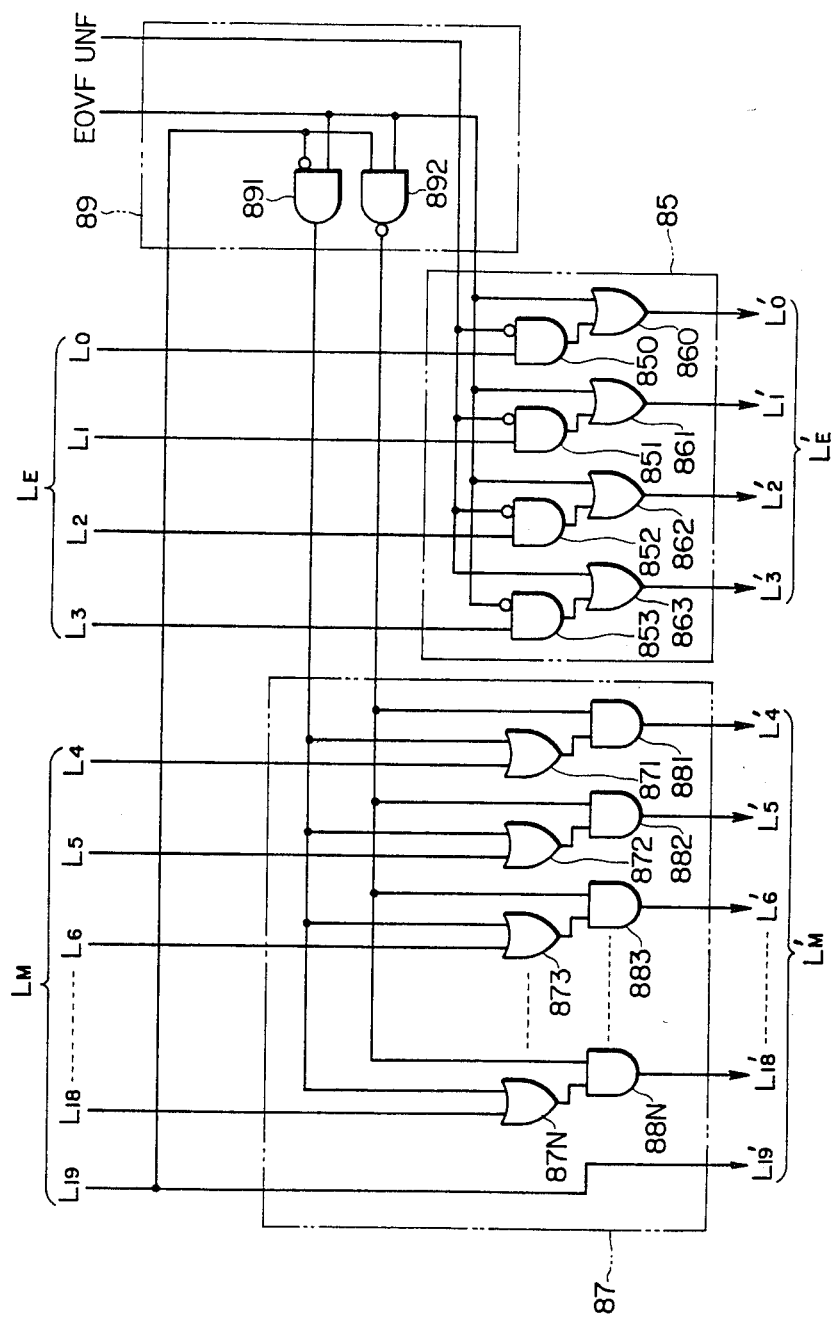
FIG. 9 is a diagram showing a specific circuit arrangement of some elements in an output correction circuit.

Referring to FIG. 9, the exponent part correction circuit 85 consists of 2-input AND gates 850-853 and 2-input OR gates 860–863 which correspond to the input bits $L_0$–$L_3$. The respective bit signals are delivered onto the accumulator 16X side through these gates. The AND gate 853 whose one input terminal receives the sign bit $L_3$ of the exponent part data has its other input terminal supplied with the inverted signal of the overflow detection signal EOVF provided from the increment circuit 83. The OR gate 863 whose one input terminal is connected with the output of the AND gate 853 has its other input terminal supplied with the underflow detection signal UNF from the subtracter circuit 78. The other input terminal of each of the AND gates 850–852 is respectively supplied with the data bits $L_0$–$L_2$ is supplied with the inverted form of the signal UNF, while the other input terminal of each of the OR gates 860–862 is supplied with the signal EOVF. The signals EOVF and UNF cannot become "1" at the same time. Therefore, when the signal EOVF is "1", the output of the exponent part correction circuit 85 becomes [0111]=+7 and makes the exponent part the maximum value. When the signal UNF is "1", it becomes [1000]=−8 and satisfies the exponent value for $\theta = \theta_2$ as stated before.

On the other hand, the mantissa part correction circuit 87 delivers the sign bit $L_{19}$ as it is and delivers the data bits $L_4$–$L_{18}$ through 2-input OR gates 871–87N and 2-input AND gates 881–88N, respectively. The other input terminal of each OR gate is supplied with the output of an AND gate 891 in the control circuit 89, while the other input terminal of each AND gate is supplied with the output of a NAND gate 892 in the control circuit 89. If, when the signal EOVF is "1", the mantissa part data is a positive value or the sign bit $L_{19}$ is "0", both the outputs of the AND gate 891 and the NAND gate 892 become "1", and the output of the correction circuit 87 becomes a positive maximum value [0111 ... 11]. If the sign bit $L_{19}$ is "1", the output of the NAND gate 892 becomes "0", so that the output of the correction circuit 87 becomes a negative maximum value [1000 ... 00]. When the signal EOVF is "0", these correction circuits 85 and 87 deliver the respective input data $L_E$ and $L_M$ as data $L_E'$ and $L_M'$ without modification. These output data $L_E'$ and $L_M'$ are delivered to the A bus 27 through the accumulator 16 as well as the switching circuit 17, and are fed back to the selector circuit 61 of the adder/subtracter 15.

Figure 10:
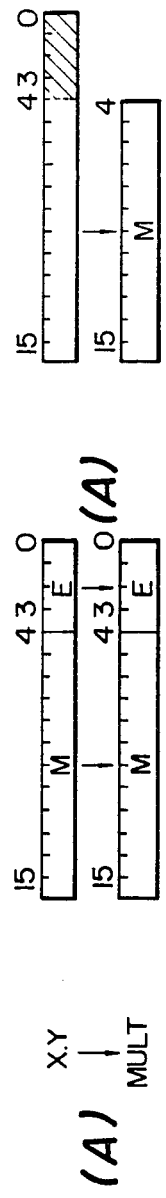
FIGS. 10(A) to 10(D) are diagrams showing the aspects of changes of floating point data in various parts of the signal processor.
Figure 10:
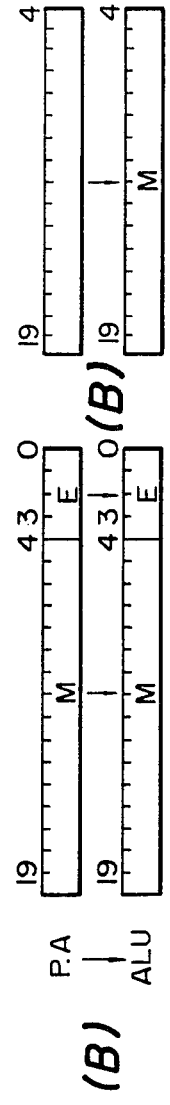
Figure 10:
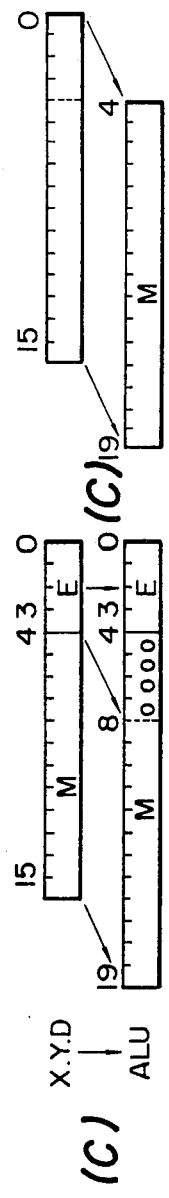
Figure 10:
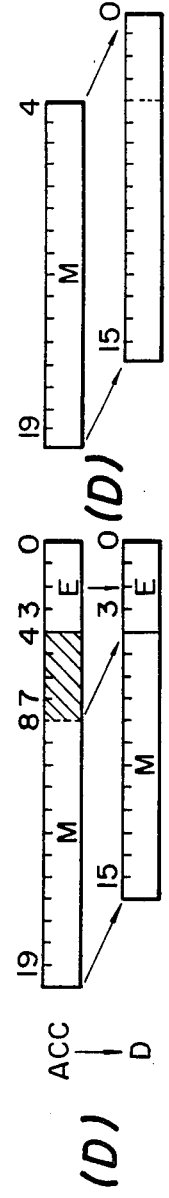

From the above description of the operations, it is understood that in the digital signal processor of the present invention, the multiplier 14 and the adder/subtracter 15 can perform floating point operations, respectively. Here, the data input from the X bus 21 or Y bus 22 into the multiplier 14 and the data input from the multiplier 14 or A bus 27 into the adder/subtracter (ALU) 15 agree in the number of bits of the input data and the number of bits of the data of the receiving side circuit, so that the bit positions are not altered between the data as illustrated in FIG. 10(A) or 10(B). However, in the case where the 16-bit data from the X bus 25, Y bus 26 or D bus 20 is applied to the adder/subtracter 15, the number of bits of the mantissa part data is not equal. This necessitates the operations of adding "0"s to less significant 4 bits of the mantissa part input data M as illustrated in FIG. 10(C) in the input selector circuits 60 and 61 of the adder/subtracter. In the case where the adder/subtracter output of 20 bits obtained in the accumulator (ACC) 16 is to be delivered to the D bus 20 of 16 bits, the operation of discarding the data forming the less-significant 4 bits of the mantissa part M and converting the 20-bit output into data of an exponent part of 4 bits, and a mantissa part of 12 bits as illustrated in FIG. 10(D), is necessitated in the switching circuit 17.

In the digital signal processor of the present invention, the input selector circuits 60 and 61 and the output switching circuit 17 which perform the foregoing data conversion operations are further contrived so that the processor can execute also fixed point operations by the appointment of a program.

Figure 11:
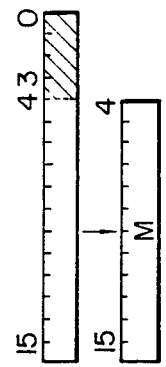
FIGS. 11(A) to 11(D) are diagrams showing the aspects of changes of fixed point data.
Figure 11:
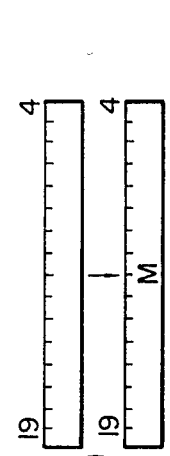
Figure 11:
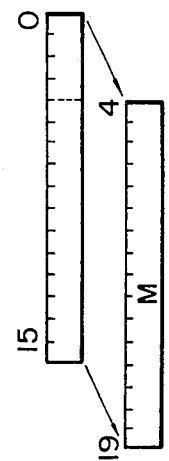
Figure 11:
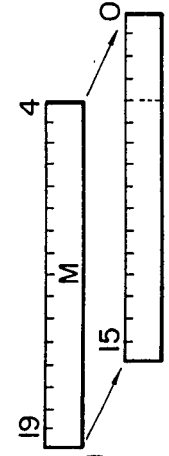

The multiplication of the fixed point data X and Y is carried out in the mantissa part data multiplier circuit 57 within the multiplier 14. In this case, of the input data X and Y of 16 bits, more-significant 12 bits to enter the mantissa part input registers 53 and 54 are handled as effective data as illustrated in FIG. 11(A). On the other hand, in the case of the addition/subtraction of the fixed point data, the shift operations of the shift circuits 69 and 76 within the adder/subtracter 15 are stopped by the control bit in the program, and the operated result of the mantissa parts obtained in this status is utilized. In order to stop the operation of the shift circuit 69, the control signal $S_7$ may be so generated that the operation instruction of the fixed point data applies data having a numerical value "0" to the data line E in FIG. 4(A) and the selector circuit 70 selects an input from the data line E. In order to stop the operation of the shift circuit 76, the control signal $S_9$ may be so generated that the data having a numerical value "0" is applied to the data line F in FIG. 4(B) and the selector circuit 82 selects an input from the data line F.

In the addition/subtraction of the fixed point data, the data input from the multiplier 14 or A bus into the adder/subtracter 15 may be executed by feeding the 16-bit data of the mantissa part similar to the case of a floating point operation as illustrated in FIG. 11(B). The data input from the X bus, Y bus or D bus is executed by putting all the bits into the mantissa part as illustrated in FIG. 11(C), and the mantissa part data obtained in the accumulator (ACC) has all the bits delivered to the D bus 20 as illustrated in FIG. 11(D).

Figure 12:
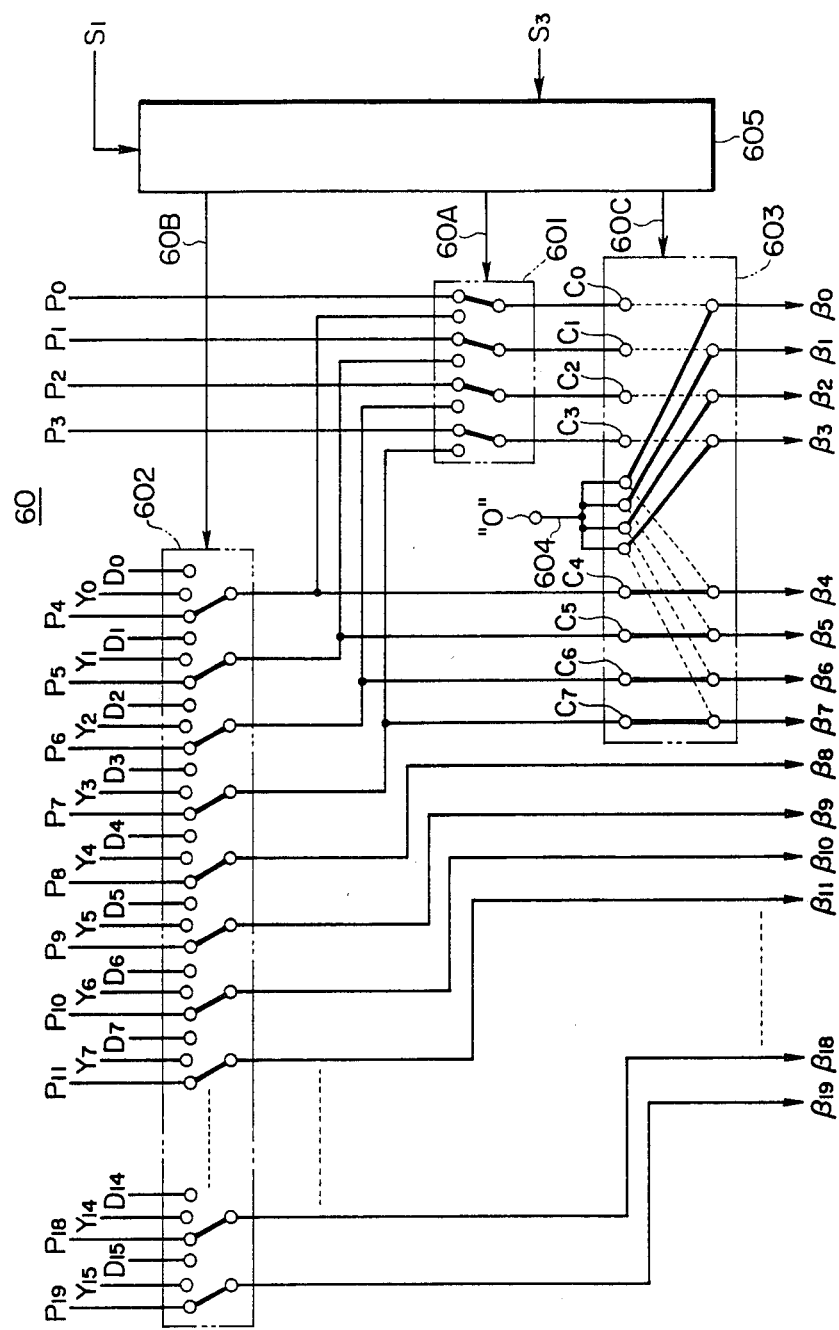
FIG. 12 is a diagram showing a specific circuit arrangement of an input selector circuit 60.

FIG. 12 shows a specific example of the input selector circuit 60 of the adder/subtracter provided with the bit exchange function stated above. In this circuit, $P_0$–$P_{19}$, $Y_0$–$Y_{15}$ and $D_0$–$D_{15}$ indicate the bits of the input data from the P bus 24, Y bus 26 and D bus 20, respectively. Among them, the exponent part at $P_0$–$P_3$ of the data P is applied to a switch 601, the four output terminals of which are connected to the terminals $C_0$–$C_3$ of a switch 603. The respective bits of the data Y and D and the bits $P_4$–$P_{19}$ of the mantissa part of the data P are applied to a switch 602. The output terminals of the switch 602 at the more-significant 12 bits are connected to output lines $\beta_8$–$\beta_{19}$ of the more-significant bits of the data $\beta$, and the output terminals of the switch 602 at the less-significant 4 bits are connected to the terminals $C_4$–$C_7$ of the switch 603 and the other input terminals of the switch 601. The switch 603 is provided with eight output terminals which are connected to output lines $\ominus_0$–$\beta_7$ of the less significant bits of the data $\beta$, and four terminals 604 which afford the status "0". Numeral 605 designates a logic circuit which generates drive signals 60A, 60B and 60C for the switches 601, 602 and 603 on the basis of the control signals $S_1$ and $S_3$ applied from the control circuit 4 in accordance with the instruction words of the program.

When a data item to be selected is specified by the control signal $S_1$, the switches 601 and 602 are respectively operated by the signals 60A and 60B, and any of the data P, Y and D is selected. At this time, if the control signal $S_3$ specifies a floating point operation, the switch 603 operates so as to connect the output lines $\beta_0$-$\beta_3$ with the terminals $C_0$-$C_3$ and the output lines $\beta_4$-$\beta_7$ with the terminals $C_4$-$C_7$ (when the input data P is selected) or the terminals 604 (when the input data Y or D is selected). If the control signal $S_3$ specifies a fixed point operation, the output lines $\beta_0$-$\beta_3$ are connected with the terminals 604 and the output lines $\beta_4$-$\beta_7$ with the terminals $C_4$-$C_7$ irrespective of the input data.

Figure 13:
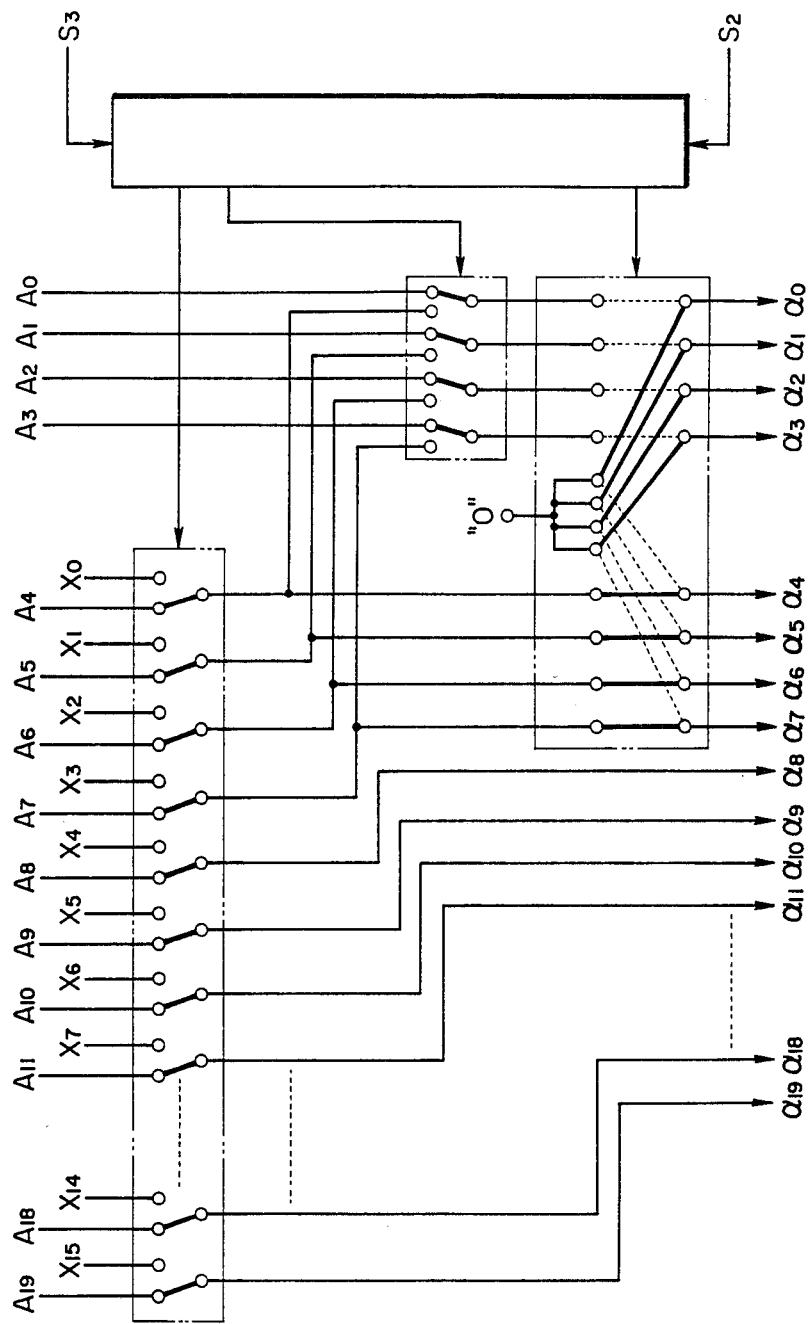
FIG. 13 is a diagram showing a specific circuit arrangement of an input selector circuit 61.

FIG. 13 shows a specific circuit arrangement of the other input selector circuit 61. This circuit is the same as that in FIG. 12 except that the input data is applied from the A bus and the X bus, and therefore, the explanation of this circuit is omitted.

Figure 14:
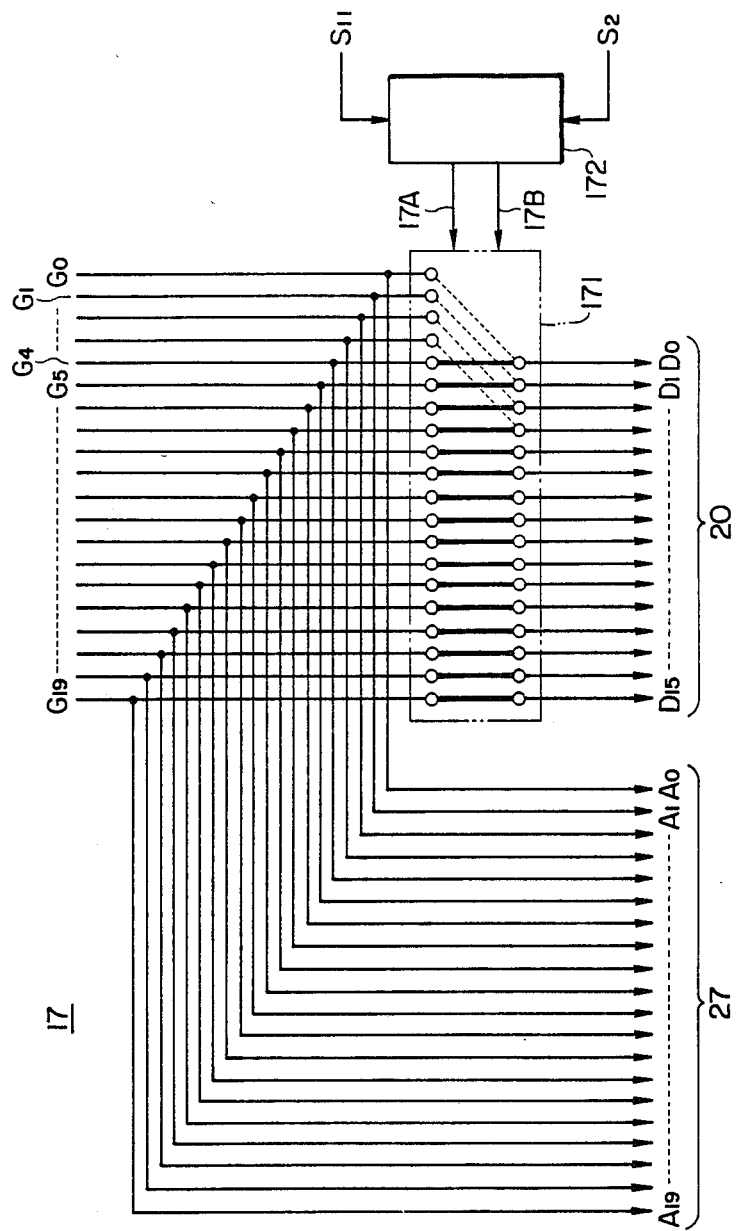
FIG. 14 is a diagram showing a specific circuit arrangement of an output switching circuit 17.

FIG. 14 shows a specific circuit arrangement of the switching circuit 17 which is connected to the accumulator 16. In this circuit, an output of 20 bits $G_0$-$G_{19}$ from the accumulator is applied to the input terminals of a switch 171. The switch 171 has sixteen output terminals which are connected with the respective signal lines $D_0$-$D_{15}$ of the data bus 20. The connections between the input terminals and the output terminals are controlled by output signals 17A and 17B from a logic circuit 172. In the case where the control signal $S_3$ based on the instruction of the program indicates a floating point operation, the switch 171 is controlled by the signal 17B and connects the signal lines $D_0$-$D_3$ forming the less-significant 4 bits on the output side with the input signal lines $G_0$-$G_3$. In the case of a fixed point operation, the switch 171 connects the lines $D_0$-$D_3$ with the lines $G_4$-$G_7$. The signal 17A controls the output forming the more-significant bit data to the data bus 20.

According to the signal processor of the present invention, not only the operation of the fixed point data or the floating point data as described above can be performed, but also an operation can be performed by converting an operated result obtained in the floating point format into data in the fixed point format in accordance with the instruction of a program or conversely by converting data given in the fixed point format into data in the floating point format. This function is very convenient when the signal processor exchanges data with an external device through the data bus 20 and the input/output interfaces 30-33. The reason therefor is as follows. Mnay of the external devices to be connected with the signal processor handle data in the fixed point representation format, and if the floating point operation result of the signal processor is delivered as it is, a special device for converting the data format is required outside the processor.

The conversion from the floating point representation into the fixed point representation (hereinbelow, termed "FLFX") is carried out as follows.

First, when data in the floating point representation to be obtained in the accumulator 16 is assumed:

$$A = \alpha_M \cdot 2^{\alpha_E}$$

data $y_1 = \beta_M \cdot 2^{\beta_E}$ whose exponent part satisfies the relation of $\alpha_E < \beta_E$ and whose mantissa part has the value of $\beta_M = 0$ is stored in a specified address of the data memory 5 or 6 in advance. This address is caused to correspond with the address part of an instruction word for the FLFX (Floating point to Fixed point) in advance. Various control signals are generated so that, when the instruction word has been executed, the selector circuit 8 may deliver to the Y bus 22 the data $y_1$ read out from the memory, the selector circuit 60 selecting an input from the Y bus, the selector circuit 61 selecting an input from the A bus 27, the selector circuit 82 selecting an input data F(="0"), the output switch 17 operating to connect the input signals $G_4$-$G_{19}$ to the data bus 20.

Thus, when the FLFX instruction has been executed, an operation is performed between the two floating-point data A and $y_1$, and the operated result of:

$$\begin{aligned} Z &= A + y_1 \\ &= [0 + \alpha_M \cdot 2^{-(\beta_E - \alpha_E)}] \cdot 2^{\beta_E} \end{aligned} \quad (6)$$

is obtained in the accumulator 16. This data has been normalized with $2^{\beta_E}$ made the reference value of the exponent part, and the data $\alpha_M \cdot 2^{-(\beta_E - \alpha_E)}$ of the mantissa part delivered to the data bus 20 can be handled as fixed point data.

Usually, the optimum value of $\beta_E$ cannot be precisely known for the internal operated result A. It is therefore preferable to select the value of $\beta_E$ to be somewhat larger. However, note needs to be taken of the fact that when the value of $\beta_E$ is made too large, the precision of the fixed point data degrades. In the case where, in the execution of the FLFX, the exponent part $\alpha_E$ of the operated result Z has become greater than the exponent part $\beta_E$ of the data $y_1$ for conversion stored in the memory in advance, the overflow of the mantissa part in Expression (6) develops. In this case, the absolute value of the fixed point data can be fixed to the positive or negative maximum value by the operation of the output correction circuit 80, as stated before.

On the other hand, the operation of data in the fixed point representation provided externally into data in the floating point representation inside the processor can be carried out as follows. First, the instruction of transmitting to the accumulator 16 the fixed point data applied to the input register 31 is executed. With this instruction, the fixed point representation data D of 16 bits applied to the selector circuit 60 through the data bus 20 is brought into the mantissa part $\beta_M$ by the bit position exchange owing to the operation of the selector circuit 60, and it is applied to the exponent part $16_M$ of the accumulator 16 through the selector circuit 67, shift circuit 69, latch circuit 72, adder 75, shift circuit 76 and correction circuit 87. In this case, the shift circuits 69 and 76 and the adder 75 are respectively controlled so as to pass the input data without modification.

Subsequently, the instruction for converting the fixed point representation into the floating point representation (hereinbelow, called "FXFL") is executed. In executing this instruction, the selector circuit 61 selects the accumulator output received from the A bus 27 or the fixed point data A as the outputs $\alpha_M$ and $\alpha_E$. The selector circuit 60 selects as the outputs $\beta_M$ and $\beta_E$ data $y_2$ for conversion which is assigned by the address part of the FXFL instruction and which is fetched from the memory 5 or 6 onto the Y bus 26. The data $y_2$ for conversion is, for example, such that the mantissa part $\beta_M$ is zero and that the exponent part $\beta_E$ is selected from a range of values [+7 - -8] and has a certain reference value. Unlike cases of executing other instructions, in the case of executing the FXFL instruction, the control signal $S_4$ is generated so as to cause the selector circuit 62 to select the input $\beta_E$, and both the inputs of the comparator circuit 63 receives $\beta_E$. In this case, the selector circuit 67 of the mantissa part is caused to select the input $\alpha_M$ and the selector circuit 68 to select the input $\beta_M$, and the selector circuit 65 of the exponent part is caused to select the input $\beta_E$. In addition, the selector circuit 70 is caused to select the input data E="0" in response to the control signal S7, to suppress the data shift operation of the shift circuit 69 in the rightward direction.

Owing to the above control operations, the outputs of the latch circuits 71, 72 and 73 become $\gamma = \beta_E$, $e_A = \alpha_M$ and $e_B = 0$. The data $e_A$ and $e_B$ are applied to the adder 75, and the added result $U_M(=\alpha_M)$ has its decimal point position moved $\theta_1$ bits under the operations of the zero detector circuit 79 and the leftward shift circuit 76. As a result, data represented by:

$$Z = [\alpha_M \cdot 2^{\theta_1}] \cdot 2^{(\beta_E - \theta_1)} \quad (7)$$

is obtained in the accumulator 16. This expression signifies that the data $A = \alpha_M$ in the fixed point representation has been normalized with reference to the exponent $\beta_E$ and is brought into the floating point representation. Accordingly, when the aforecited data obtained in the accumulator 16 with the instruction FXFL is employed, subsequent operations can be performed in the floating point format.

In this embodiment, after the data of the input register 31 has been once set in the accumulator 16, the FXFL instruction is executed. However, design can also be made so that the input data in the fixed point representation and the data $y_2$ for conversion are applied to the adder/subtracter 15 by utilizing the X bus 25 and the D bus 20, whereby the data conversion into the floating point representation is permitted with a single instruction.

The digital signal processor of the present invention can handle data in both the fixed point and floating point formats as stated above. Moreover, when an underflow has developed in an exponent part in case of the normalization of floating point representation data, the normalization operation with an exponent value fixed to the minimum value can be performed. Therefore, the arithmetic operation can be automatically changed-over to the floating point operation format in the case where the numerical value of an internal operation data is large, and to the fixed point operation format in the case where it is small. Thus, a very wide dynamic range can be attained.

Figure 15:
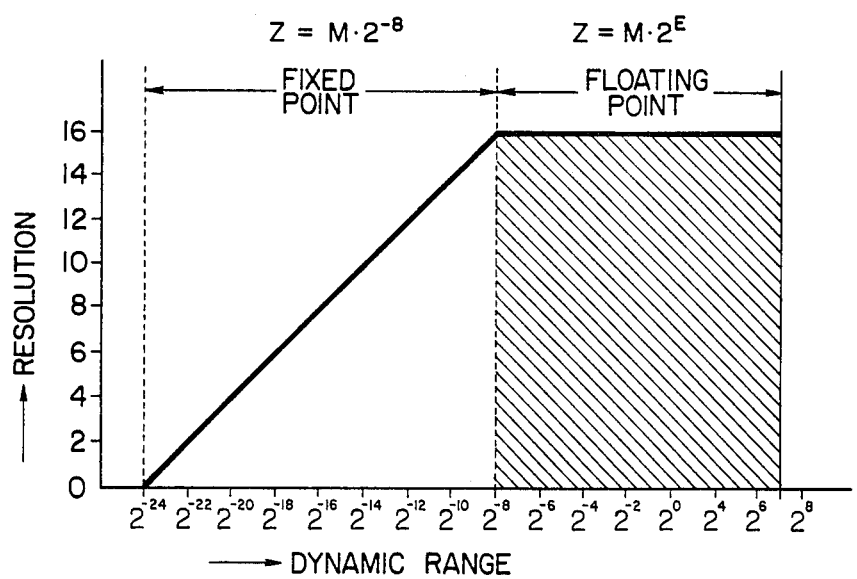
FIG. 15 is a diagram showing the dynamic range of the digital signal processor according to the present invention.

More specifically, in the case where the internal data of the adder/subtracter consists of the mantissa part of 16 bits and the exponent part of 4 bits as in the apparatus of the embodiment, the described exponent part $\gamma$ can handle numerical values in the range of $[+7 - -8]$ in the representation of 2's complements. When all operations are processed in the floating point format, the dynamic range becomes $2^{-8} \cdot 2^7$ indicated by hatched lines in FIG. 15, and this corresponds to 15 bits in terms of the number of bits. According to the present invention, when the number of normalized bits $\theta$ for the mantissa part of an operation data falls in a range of $(\gamma - \theta) < -8$, the exponent $L_E$ after the normalization is fixed to $-8$, whereby the arithmetic operation can be changed-over to the fixed point operation format. For this reason, the dynamic range becomes 31 bits as a whole, as indicated in FIG. 15, and the range of numerical values which can be treated spreads remarkably in comparison with that in the case of employing only one of the fixed and floating point formats.

In the actual application of the digital signal processor, it is often the case that m mulitiply and add operations are repeatedly executed as indicated by way of example by the following expression:

$$T = \sum_{i=1}^{m} a_i \times b_i \quad (8)$$

In the case of such operation, according to the processor of the present invention, it becomes possible to enhance the data processing efficiency and to perform operations at high speeds by means of the pipeline control which carries forward the multiplying and adding-/subtracting operations in parallel.

Figure 16:
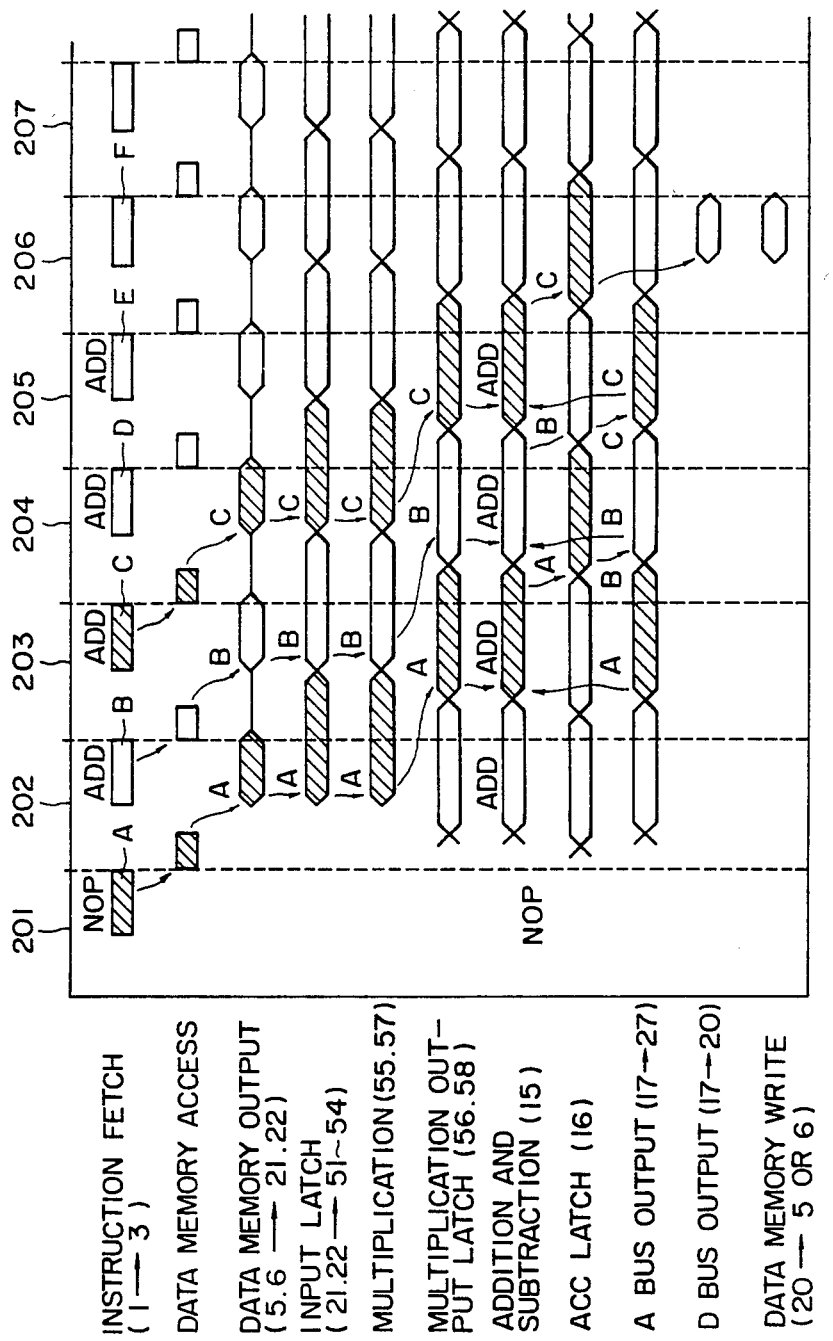
FIG. 16 is a time chart for explaining a feature of the operation of the processor.

FIG. 16 is a time chart showing an example of the parallel operations. Using an instruction A previously fetched in an instruction cycle 201, data is read out from the data memories and operated on by a multiplier in the next cycle 202. In an instruction cycle 203, the addition or subtraction operation between the multiplied result and the data of the accumulator (A bus output) is executed. The operated result is delivered to the accumulator in a cycle 204. These operations of the four steps are repeated in the respective instruction cycles with each shift of 1 step. When the multiply and add operations of the predetermined times m have ended, the operated result T is delivered to the data bus 20 and transmitted to the data memory 5 or an external circuit by an instruction F.

The parallel operations of the processor based on the pipeline control are permitted owing to the fact that the multiplier 14 and the adder/subtracter 15 are serially connected, and to the fact that registers for temporarily holding data (in FIG. 4(A) and 4(B), the latch circuits 71-72 correspond thereto) are arranged in positions in which required times for the operations of the multiplication and the addition/subtraction balance.

Figure 17:
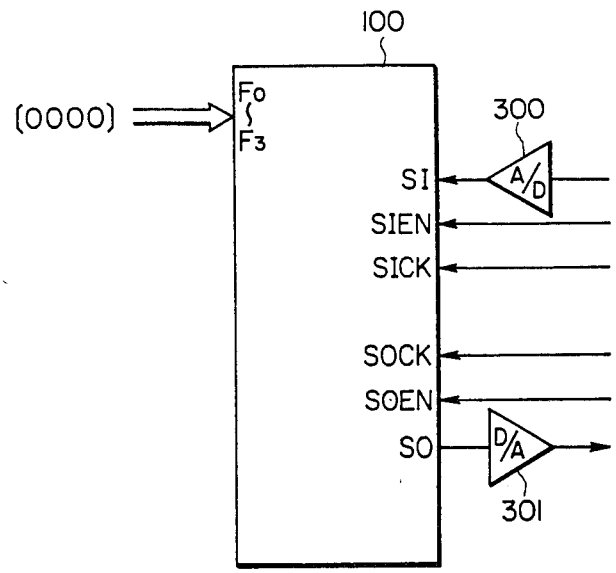
FIGS. 17 and 18 are block diagrams each showing a typical form of use of the signal processor.

FIG. 17 shows an example of an application of the digital signal processor. Here is illustrated a case where a processor 100 is connected to an analog circuit through an A/D converter 300 as well as a D/Aconverter 301 and where the function of a digital filter is effected.

Figure 18:
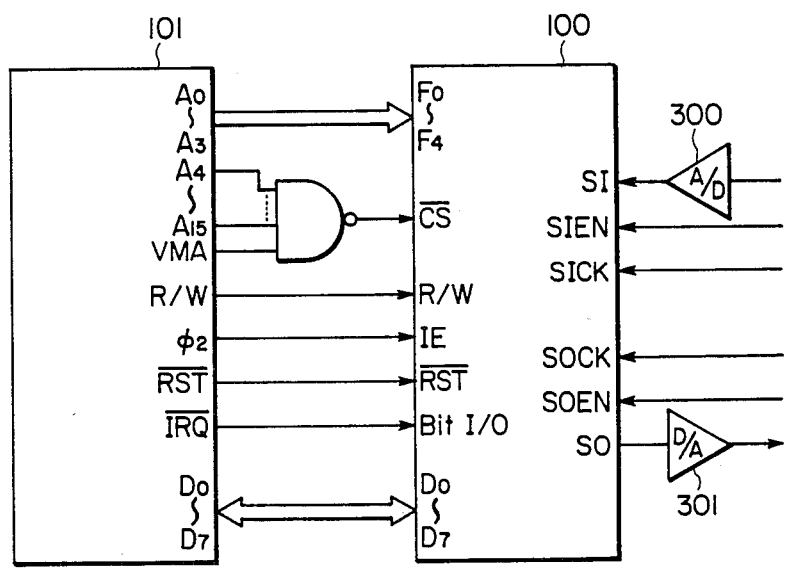

FIG. 18 shows a system construction in which the digital signal processor 100 is combined with another data processor 101, for example, a microcomputer 'MCS 6800' of Hitach Ltd., data is exchanged therebetween through terminals $D_0$–$D_7$, and the processings of data can be allotted to the two devices. This system construction is suitable in cases of applying the signal processor 100 to a modem, echo canceler etc. of a communication line.

What is claimed is:

1. An adder for floating point data comprising:
   adjusting means for adjusting two floating point data so that the two data have an exponent part of the same value and respective adjusted mantissa parts;
   adding means connected to said adjusting means for adding the two adjusted mantissa parts of the two data;
   shifting means connected to said adding means for shifting the output data of said adding means;
   first means connected to said adding means and responsive to the output thereof for providing a first shift data signal having a value necessary for normalization of said output data of said adding means;
   second means responsive to the exponent part at the output of said adjusting means and said first shift data signal for providing difference data representing the difference between the value of said exponent part and the value of said first shift data signal, and for generating an underflow signal when said difference is less than a minimum value predetermined for an exponent of any floating point data;

third means for providing, as a normalized exponent part of the sum of the two data, a minimum value data corresponding to said minimum value or said difference data, depending upon whether or not said underflow signal is generated; and fourth means for providing the shifting means with a second shift data signal or said first shift data signal depending upon whether or not said underflow signal is generated, said second shift data signal having a value equal to the difference between the exponent part at the output of said adjusting means and said minimum value so as to control said shifting means to provide a normalized mantissa part for the sum of said two data.

2. An adder according to claim 1, wherein said first means comprises means for detecting the number of successive bits including the most significant bit of the output of said adding means having the same value as a sign bit of said output and for generating said first shift data signal having a value corresponding to said detected number.

3. An adder according to claim 1, wherein said second means comprises means for subtracting the first shift data signal from the exponent part of the output of said adjusting means, including means for providing said underflow signal when the result of said subtraction operation is less than said minimum value.

4. An adder according to claim 1, wherein said third means comprises gate means responsive to said underflow signal for passing the difference data when the underflow signal is not provided thereto and for providing predetermined data instead of said difference data when the underflow signal is provided thereto.

5. An adder according to claim 1, wherein said fourth means comprises:

means responsive to the exponent part at the output of said adjusting means for generating said second shift data signal; and means responsive to said underflow signal for selecting one of said first and second shift data signals to provide a selected shift data signal to said shifting means.

6. An adder for floating point data comprising:

adjusting means for adjusting two floating point data so that the two data have an exponent part of the same value and respective adjusted mantissa parts;

adding means connected to said adjusting means for adding two adjusted mantissa parts of said two data;

shifting means connected to said adding means for shifting the output data of said adding means in bilateral directions;

controlling means responsive to the output data of said adding means and an adder overflow signal provided by said adding means for controlling the shift amount and shift direction of said shifting means necessary for normalization of the output data of said adding means;

first means connected to said adjusting means and said controlling means for providing a normalized exponent part of a sum of said two data by modifying the same value exponent part depending upon the shift amount and the shift direction and for providing an exponent overflow signal when the normalized exponent part exceeds a predetermined maximum exponent value;

second means for providing a predetermined maximum exponent value or the normalized exponent part provided by said first means depending on whether or not the exponent overflow signal is generated; and third means for providing the output data of said shifting means as a normalized mantissa part of the sum of said two data and a predetermined maximum positive value or a predetermined minimum negative value depending on a sign bit of the output data of said shifting means in response to said exponent overflow signal.

7. An adder according to claim 6, wherein said controlling means comprises means for detecting the number of successive bits including the most significant bit of the output data of said adding means and having a same value as a sign bit of the output data of the adding means and for controlling the shifting means to effect a shift of data in one direction by the amount of the detected number when the adder overflow signal is not provided by said adding means; and means for providing said adder overflow signal to said shifting means to control said shifting means for a shift in the other direction by one bit.

8. An adder according to claim 7, wherein said first means comprises:

means for subtracting the number of successive bits detected in said controlling means from the value of the exponent part provided by said adjusting means;

fourth means connected to said subtracting means for providing an output by incrementing by one the output data of said subtracting means or by passing therethrough the output data of said subtracting means depending upon whether or not the adder overflow signal is provided thereto, and for providing the exponent overflow signal when the result of the incrementing operation exceeds said predetermined maximum exponent value; and wherein said second means comprises:

means for providing, as the normalized exponent part, said predetermined maximum exponent value or the output data of said fourth means depending upon whether or not the exponent overflow signal is provided thereto.

9. An adder according to claim 7, wherein said shifting means includes means for shifting in a carry signal provided by said adding means when said controlling means operates to control the shifting means for the shift in said other direction to provide the shifted-in carry signal as a sign bit of the output of said shifting means.

* * * * *